(12) United States Patent
Rupp

(10) Patent No.: US 6,389,084 B1
(45) Date of Patent: May 14, 2002

(54) APPARATUS AND METHOD FOR EQUALIZING A SIGNAL INDEPENDENT OF THE IMPACT OF DOPPLER FREQUENCY

(75) Inventor: Markus Rupp, Lincroft/Monmouth, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/131,388

(22) Filed: Aug. 7, 1998

(51) Int. Cl.⁷ .............................................. H04L 27/30
(52) U.S. Cl. .................... 375/343; 342/101; 375/229
(58) Field of Search .................. 375/150, 152, 375/229, 232, 343, 346, 350; 342/99, 101, 189

(56) References Cited

U.S. PATENT DOCUMENTS

| | | | |
|---|---|---|---|
| 5,301,167 A | * 4/1994 | Proakis et al. | 367/134 |
| 5,524,629 A | * 6/1996 | Mahony | 128/661.08 |
| 5,647,366 A | * 7/1997 | Weng | 128/661.09 |
| 5,712,877 A | * 1/1998 | Ho et al. | 375/284 |
| 5,744,710 A | * 4/1998 | Abatzoglou et al. | 73/170.11 |
| 5,899,864 A | * 5/1999 | Arenson et al. | 600/455 |
| 5,973,642 A | * 10/1999 | Li et al. | 342/378 |
| 6,104,747 A | * 8/2000 | Jalloul e al. | 375/150 |
| 6,135,962 A | * 10/2000 | Bashford et al. | 600/443 |

OTHER PUBLICATIONS

*Microwave Mobile Communications*, William C. Jakes, IEEE Press Classic Reissue, 1974, pp. 31–36.
*Probability, Random Variables, and Stochastic Processes*, Athanascos Papoulis, McGraw–Hill Book Company, 1987, pp.485–495.

\* cited by examiner

*Primary Examiner*—Young T. Tse
(74) *Attorney, Agent, or Firm*—Birch Stewart Kolasch & Birch (57) ABSTRACT

A method and apparatus for equalizing a signal to accurately deconvolute the channel includes deriving a functional relationship between Doppler frequency and variance between the instantaneous energy of the received signal and the mean energy of the received signal. Theoretical values of Doppler frequency for a range of values of variance are mapped based on the derived functional relationship. The variance of a received signal is determined and the corresponding Doppler frequency estimate selected from the map. Optimal equalization learning parameters are then selected based on the corresponding Doppler frequency estimate so that the received signal may be deconvoluted independent of the impact of Doppler frequency.

27 Claims, 5 Drawing Sheets

APPARATUS AND METHOD FOR EQUALIZING A SIGNAL INDEPENDENT OF THE IMPACT OF DOPPLER FREQUENCY

FIELD OF THE INVENTION

1. Technical Field

The present invention relates to a technique for selecting optimum equalization learning parameters in a mobile communication system based on estimation of Doppler frequency of a signal.

2. Description of the Background Art

In a mobile communication system, a channel between a base station and a mobile station is corrupted due to fading as the channel gain varies over time. The channel is also corrupted due to thermal noise and noise generated by components of the receiver. In general, a signal as received over a channel must be deconvoluted to remove past values of the transmitted signal which are intermingled with instantaneous values of the transmitted signal. Typically, an equalizer is used to deconvolute the channel. The equalizer must be adaptive to learn the environment since fading is different in each channel.

In a mobile communication system, the mobile station moves with respect to the base station. As a result of the relative movement, the channel is also frequency shifted due to Doppler speed. An equalizer is typically designed to deconvolute the channel to remove the convolutional components. However, a typical equalizer cannot distinguish between the channel and the effects of Doppler speed. If the Doppler frequency is large, the equalizer will have difficulties deconvoluting the channel. For instance, the equalizer will attempt to adapt to the Doppler frequency in order to keep up with the relative movement between the base station and the mobile station, but will fail to deconvolute the channel accurately and quickly.

SUMMARY OF THE INVENTION

In the present invention, optimum equalization learning parameters are determined to make deconvolution independent of the impact of Doppler frequency. A functional relationship between the received signal and a parameter indicative of an estimate of Doppler frequency is derived. Values of estimated Doppler frequency are mapped with respect to variance between instantaneous energy of the received signal and mean energy of the received signal based on a theoretical functional relationship. The variance of a received signal is determined and the corresponding estimated Doppler frequency is thereafter derived from the map. An optimum equalization learning parameter is then selected in accordance with the estimate of Doppler frequency. Accuracy and speed of the equalization process are thus improved, independent of the impact of Doppler frequency.

DETAILED DESCRIPTION OF PREFERRED EMBODIMENTS

Figure 1:
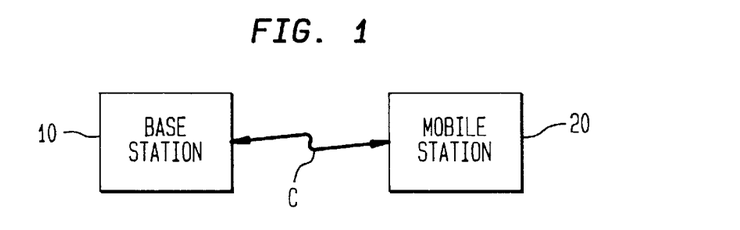
FIG. 1 illustrates a base station and mobile station of a mobile communication system.
Figure 2:
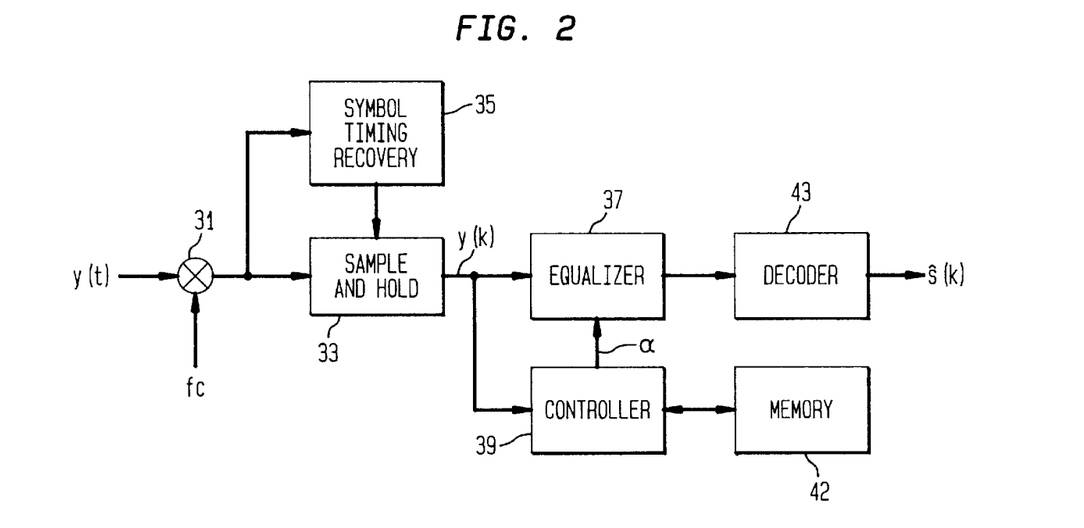
FIG. 2 illustrates a preferred embodiment of a signal receiver of a mobile communication system of the present application.

FIG. 1 illustrates a mobile communication system including base station 10 and mobile station 20. Channel C established between base station 10 and mobile station is corrupted due to fading and noise. FIG. 2 illustrates a receiver of a preferred embodiment of the invention that may be implemented within either mobile station 20 for receiving signals transmitted from base station 10 or implemented within base station for receiving signals transmitted from mobile station 20.

In FIG. 2, received signal y(t) is a continuous time waveform that may have a carrier frequency in the range of 800–900 MHz. The received signal is mixed with local oscillator signal $f_c$ in mixer 31 to be down-converted to baseband. The corresponding baseband signal is sampled in sample and hold circuit 33 which outputs samples y(k) of the down-converted baseband signal. The down-converted baseband signal is also provided from mixer 31 to symbol timing recovery circuit 35 which controls sample and hold circuit 33 to sample the down-converted baseband signal at the proper time. Sample and hold circuit 33 and symbol timing recovery circuit 35 may be conventional mobile communication components.

Sampled received signal y(k) output from sample and hold circuit 33 is provided to equalizer 37 which deconvolutes the signal to remove convolutional components Equalizer 37 may be a conventional adaptive equalizer which uses either a least-means square (LMS) algorithm or a recursive-least-squares (RLS) algorithm. Sampled received signal y(k) is also provided to controller 39 which processes the signal to determine an estimate of the Doppler frequency of the received signal. Controller 39 accesses memory 42 to retrieve an optimum equalization learning parameter based on the estimated Doppler frequency. The optimum equalization learning parameter a is provided to equalizer 37 by controller 39.

Equalizer 37 deconvolutes the received signal independent of the impact of Doppler frequency based on the optimum equalization learning parameter. The deconvoluted signal is output from equalizer 37 to decoder 43 which decodes the deconvoluted signal to provide decoded signal $\hat{s}(k)$. Controller 39 may be microprocessor-based and may function to estimate Doppler frequency and access memory 42 to retrieve an optimum equalization learning parameter in accordance with software programming stored in memory 42 or stored within controller 39. If equalizer 37 uses an LMS algorithm, controller 39 accesses memory 42 to retrieve an optimum step-size in accordance with the estimated Doppler frequency and provides the optimum step-size to equalizer 37 as optimum equalization learning parameter α. If equalizer 37 uses an RLS algorithm, controller 39 accesses memory 42 to retrieve an optimum forgetting factor in accordance with the estimated Doppler frequency and provides the optimum forgetting factor to the equalizer 37 as optimum equalization learning parameter α.

Memory 42 may store optimum equalization learning parameters for various different Doppler frequencies. Memory 42 may be a look-up table, a CD ROM or any equivalent memory accessible by controller 39. In the alternative, controller 39 may internally store optimum equalization learning parameters for various Doppler frequencies in a look-up table or memory so that separate memory 42 is not necessary.

Derivation of the Doppler frequency estimate by controller 39 will now be described. It is assumed that the sampled received signal y(k) refers to a signal received over a channel exposed to single path flat Rayleigh fading with additive noise and may be represented as:

$$y(k)=c(k)s(k)+v(k) \qquad (1).$$

The fading properties of the channel are all concentrated in one random process c(k) wherein s(k) represents the transmitted signal and v(k) represents thermal noise and/or electronic component noise. The random process c(k), which is indicative of how fading may vary over time, is represented as:

$$c(k)=fc(k-1)+\sqrt{1-f^2}w(k) \qquad (2).$$

The driving process w(k) is assumed to be complex-valued, statistically white Gaussian noise with unit variance. The only parameter f in equation (2) defines the dynamic of the process and is thus related to the Doppler frequency.

In order to solve for the parameter f of equation (2), the autocorrelation function (ACF) of the random process c(k) is given as:

$$r_c(l)=E[c(k)c^*(k+l)]=f^{|l|} \qquad (3).$$

The ACF may thus be defined as the expectation E of c(k) multiplied by the complex conjugate of c(k+l). The complex conjugate of c(k+l) is representative of the fading properties of the channel at time k+l, where l is a parameter equivalent to time lag. The larger the value of time lag l, the smaller the ACF becomes. In accordance with a simplification which will be described in greater detail as follows, the ACF of c(k) may be assumed as equivalent to $f^{|l|}$.

The true value of the ACF of c(k) is a Bessel-function which may be represented as:

$$r_c(l)=J_o(2\pi f_D T_s l) \qquad (4).$$

Figure 3:
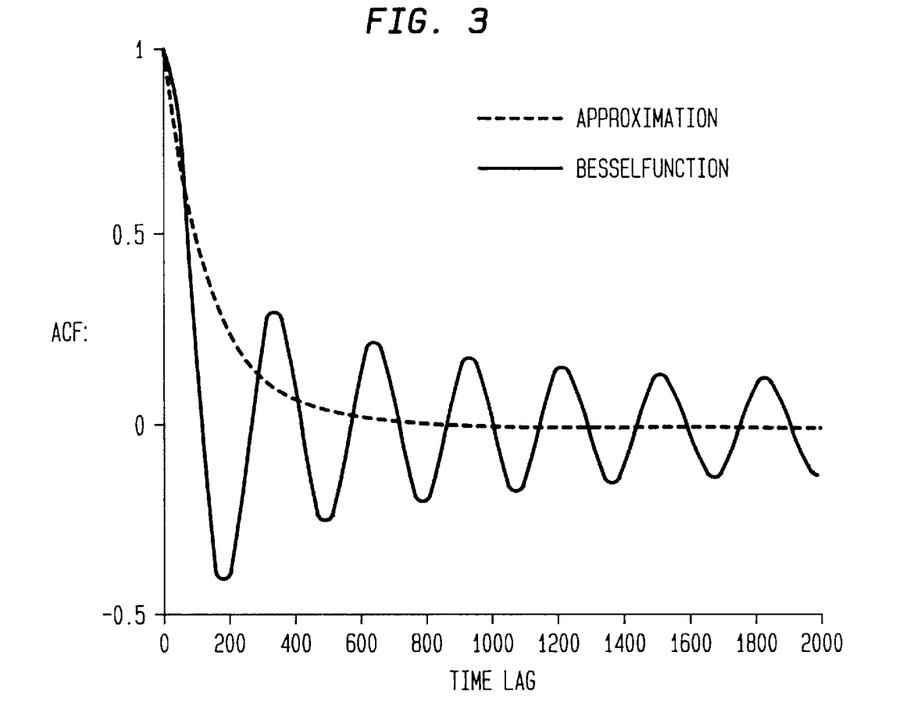
FIG. 3 illustrates an autocorrelation function of the random process c(k) as a Bessel-function and a simplified autocorrelation function of random process c(k)

The Bessel-function of the true ACF of c(k) is illustrated in FIG. 3 as a function of time lag l. The parameter $f_D$ in equation (4) is related to Doppler frequency and is representative of the slope of the Bessel-function illustrated in FIG. 3. The ripples which begin at the zero crossing indicated at x in FIG. 3 decrease in time.

Assuming that the ACF dies out smoothly after zero crossing x, the graph of the Bessel-function may be simplified as the approximation illustrated in FIG. 3 by disregarding the ripples. This simplification is realistic since the relevant portion of the Bessel-function of the ACF from the standpoint of the equalizer is in the range of l=0 to l=x. An equalizer which uses an adaptive algorithm would essentially follow the above-noted relevant portion of the ACF. This simplification enables the ACF of c(k), denoted as $r_c(l)$ in equation (3), to be assumed equivalent to $f^{|l|}$, which simplifies the derivation of the mapping by controller 39, as will be described subsequently with respect to equation (13).

As described above, equation (2) describes the fading properties of a channel in terms of parameter f which represents an estimate of Doppler frequency. The random process c(k) representative of the fading properties of the channel cannot be readily extracted by controller 39 from sampled received signal y(k). However, the instantaneous energy of the received signal may be represented as:

$$|y(k)|^2=|c(k)s(k)+v(k)|^2 \qquad (5).$$

The transmitted symbols s(k) are statistically white. Noise v(k) is assumed to be relatively small compared to s(k) and thus may be disregarded. Since the signal as transmitted is ideally phase modulated, such as constant modulus phase shift keying (PSK), the sampled received signal will be one of four phases and will have unit magnitude, such that $|s(k)|=1$. The instantaneous energy of the sampled received signal $|y(k)|^2$ may therefore be assumed as approximately equivalent to $|c(k)|^2$. Thus, even though random process c(k) cannot be directly derived by controller 39 from sampled received signal y(k), the fading properties of the channel can be indirectly observed in view of the sampled received signal y(k)

Figure 4:
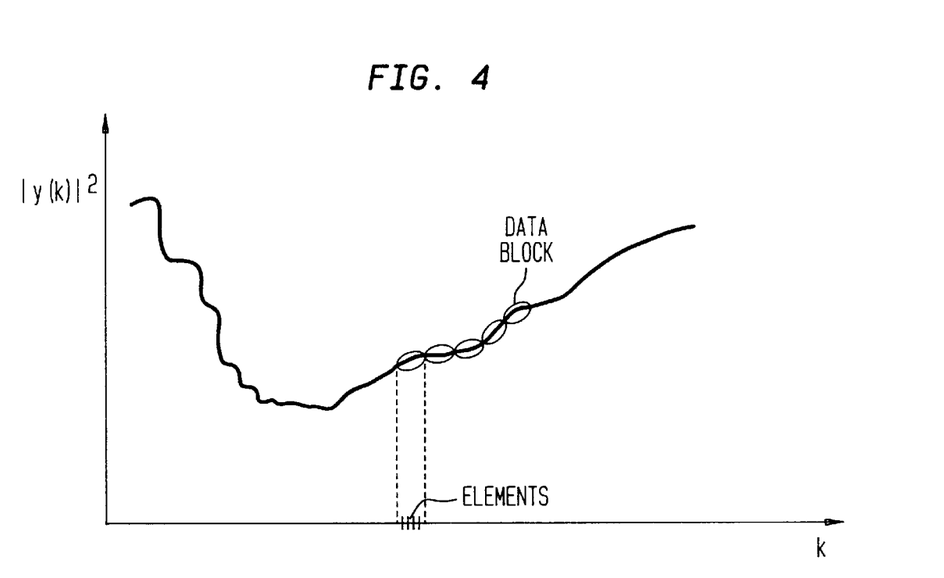
FIG. 4 illustrates instantaneous energy of a sampled received signal y(k)

Since random process c(k) can be indirectly observed in view of sampled received signal y(k), the parameter f representative of Doppler frequency may be derived or observed in view of the instantaneous energy of the sampled received signal y(k). FIG. 4 illustrates the instantaneous energy of the sampled received signal denoted as $|y(k)|^2$. The movement or changes in random process c(k) follow the changes in the instantaneous energy of the sampled received signal. In view of equations (2) and (3), and since Doppler frequency is strongly correlated to instantaneous energy of the sampled received signal, parameter f may be estimated based on observed energy values $|y(k)|^2$ of the instantaneous energy of the sampled received signal over a short period of time. If the instantaneous energy of the sampled received signal is considered at one point in time in relation to another point in time, information regarding parameter f may be estimated.

IS-136 is a standard for mobile communication systems wherein 162 data symbols are transmitted for each data slot. However, in a preferred embodiment of the invention, 162 data symbols and 14 data symbols replacing an adjacent sync word are transmitted so that a total of 176 data symbols are transmitted per data slot. As illustrated in FIG. 4, each data slot is divided into N smaller blocks of L elements, such that L=176/N. The relationship between the instantaneous energy of the sampled received signal y(k) with respect to parameter f indicative of an estimate of Doppler frequency is derived based on the variance of blocks N. The variance is a statistical measurement of the fluctuation of the instantaneous energy of the sampled received signal y(k) with respect to the mean energy of the sampled received signal y(k).

Figure 9:
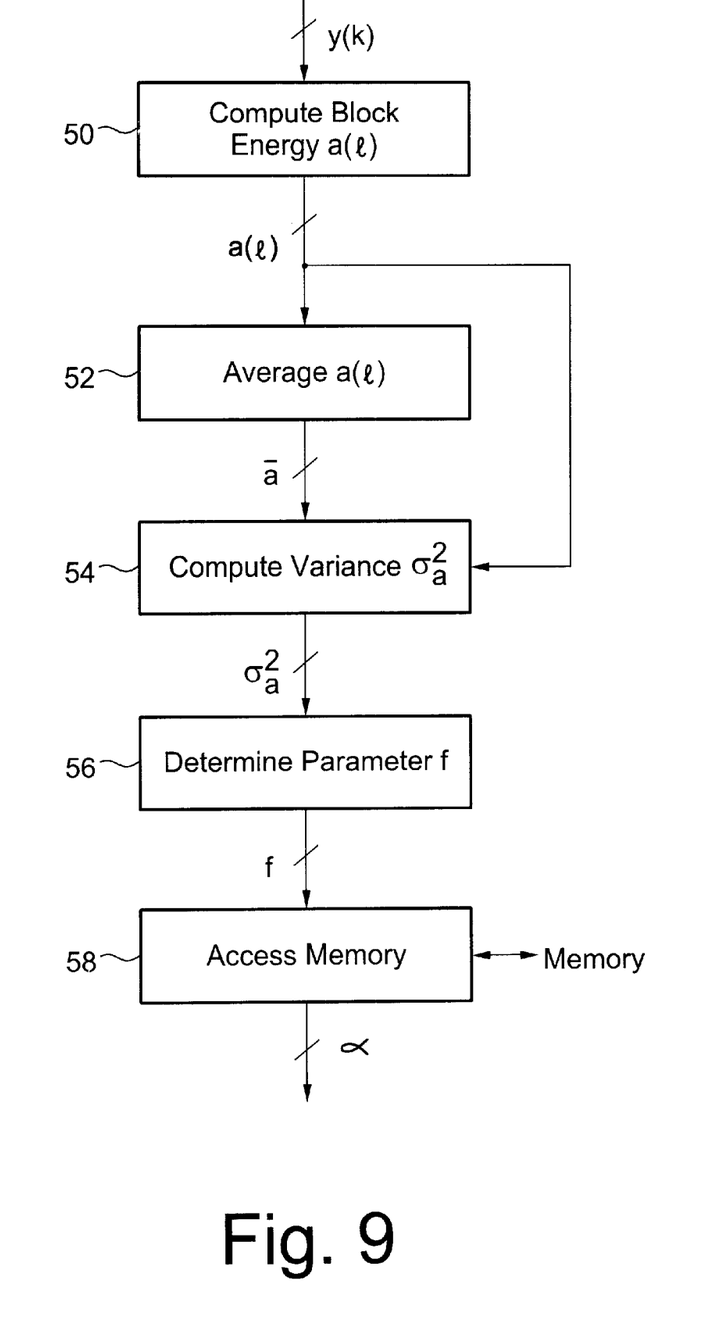
FIG. 9 illustrates the operation of a controller according to one embodiment of the invention.

As shown in FIG. 9, controller 39 first divides sampled received signal y(k) into N smaller blocks of L elements. The average energy a(l) of each block N is determined by controller 39 in step 50 as follows:

$$a(l) = \frac{1}{L}\sum_{i=1}^{L}|y(i+(l-1)L)|^2, \quad (6)$$

wherein l varies from 1 to N. The mean energy $\overline{\alpha}$ of the average energy of the blocks is thereafter derived by controller 39 as follows:

$$\overline{a} = \frac{1}{N}\sum_{i=1}^{N}a(i). \quad (7)$$

Thereafter, in step 54, controller 39 determines the variance $\sigma_a^2$ in view of the mean energy as follows:

$$\sigma_a^2 = \frac{1}{N}\sum_{i=1}^{N}(a(i)-\overline{a})^2. \quad (8)$$

The expectation E of the variance $\sigma_a^2$ can be derived in terms of parameter f indicative of the estimate of the Doppler frequency as follows:

$$E[\sigma_a^2] = \beta\left[1 - \frac{1}{N^2}\frac{1}{1-f^{2L}}\left(N(1+f^{2L}) - 2f^{2L}\frac{1-(f^{2L})^N}{1-f^{2L}}\right)\right], \quad (9)$$

wherein $$\beta = \frac{1}{(1-f^2)L^2}\left[L(1+f^2) + 2f^2\frac{f^{2L}-1}{1-f^2}\right]. \quad (10)$$

The derivation of equation (9) is provided in Appendix A.

Figure 5:
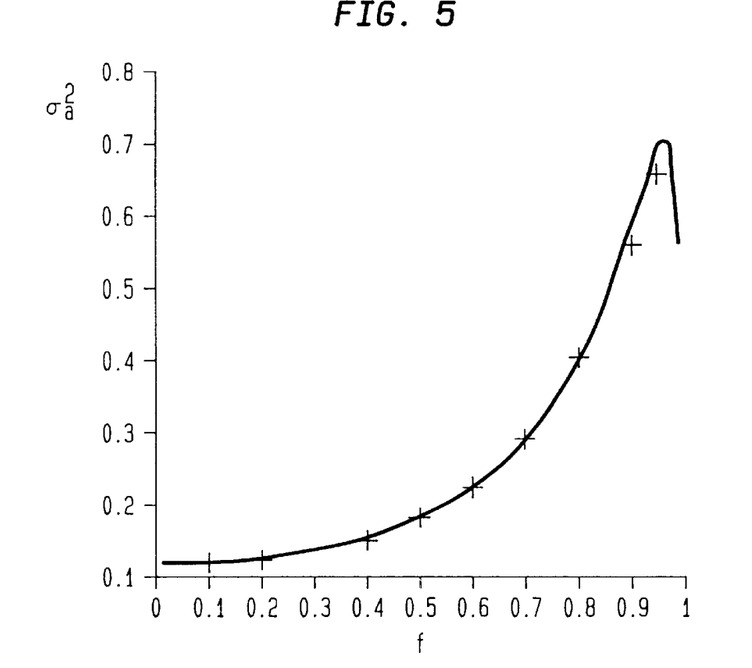
FIG. 5 illustrates a plot of variance $\sigma_a^2$ as a function of parameter f indicative of an estimate of the Doppler frequency.

FIG. 5 illustrates a plot of variance $\sigma_a^2$ as a function of parameter f based on equation (9), With L=8 and N=22. Included in the plot are markers (+) at which the function has been checked via simulation. For the simulation, a signal is transmitted such that the Doppler frequency of the signal as received has a fixed value f. The corresponding value of $\sigma_a^2$ for the simulated fixed value f is determined based on equations (6)–(8). It may be concluded in view of FIG. 5 that the theoretical plot agrees very closely with the simulated estimates.

Figure 6:
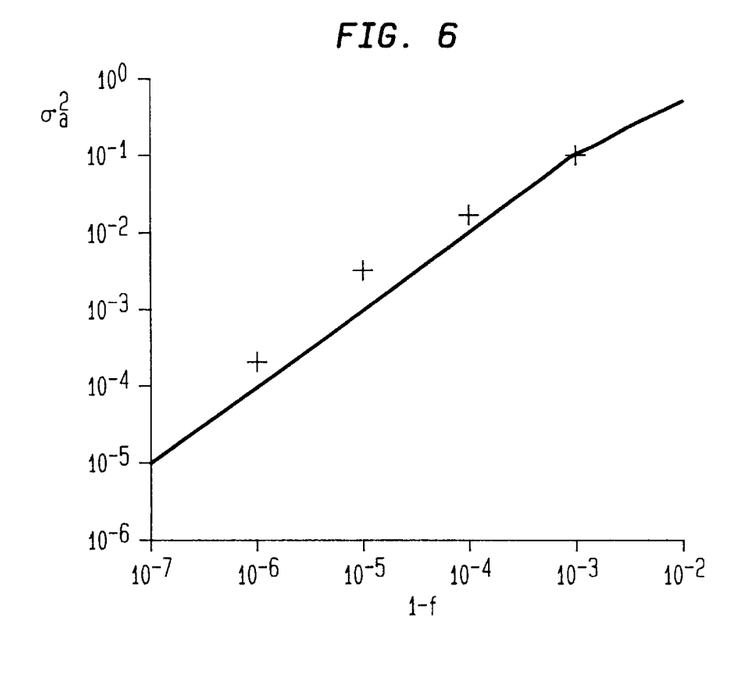
FIG. 6 illustrates a double-logarithmic plot of variance $\sigma_a^2$ as a function of (1–f)

The function of equation (9) as illustrated in the plot of FIG. 5 monotonically increases with respect to parameter f until a maximum of approximately f=0.97 is reached. The function thereafter decreases monotonically approaching f=1. Since equation (9) is not a monotonic function, there may be two values of parameter f for a given value of variance $\sigma_a^2$. However, typical values of parameter f for flat Rayleigh fading are very close to 1. As such, the area of descending slope is the area of interest of the plot of FIG. 5. FIG. 6 illustrates the descending slope area of interest of the plot of FIG. 5, in terms of 1−f and with double logarithmic scale. The area of interest is thus represented as a rising slope. The markers (+) in FIG. 6 confirm that the theoretical plot agrees very closely with the simulated estimates for values of parameter f very close to 1. Thus, a relationship between Doppler frequency and the received signal may be derived from the instantaneous energy of the received signal, so that an optimum equalization learning parameter may be selected for the received signal as follows.

Returning to FIG. 2, in a preferred embodiment controller 39 is programmed to determine the variance $\sigma_a^2$ upon receipt of a sampled received signal y(k) from sample and hold circuit 33 using equations (6)–(8) according to steps 50, 52, 54, 56 and 58, as shown in FIG. 9. In step 56, controller 39 calculates a value of parameter f for the determined variance $\sigma_a^2$ using equation (9), with the values L and N being selectable. Alternatively, a plurality of look-up tables are prestored within an internal memory of controller 39 so that a corresponding parameter f for particular values of L and N can be retrieved for a determined variance $\sigma_a^2$.

Thereafter, in step 58, controller 39 accesses memory 42 which stores optimum equalization learning parameters for a wide range of values of parameter f Memory 42 may store optimum step-size values for an equalizer that uses an LMS algorithm, may store optimum forgetting factors for an equalizer that uses an RLS algorithm, or may store both. Controller 39 retrieves the particular type of equalization learning parameter depending upon the type of equalizer used in the system. Controller 39 outputs the optimum equalization learning parameter to equalizer 37 as α. Equalizer 37 then equalizes the sampled received signal y(k) in accordance with the equalization learning parameter so that deconvolution can be performed independent of effects of Doppler frequency.

A simplification assumed in the analysis is that the channel is exposed only to flat Rayleigh fading, which would be the case when the mobile and base station are transmitting and receiving over a direct line of sight with no reflections. However, in reality buildings, cars or mountains may cause reflections. In a severe scenario, the transmitted signal may be reflected strongly off a building for example and may be received with a delay of one full symbol duration T.

Figure 7:
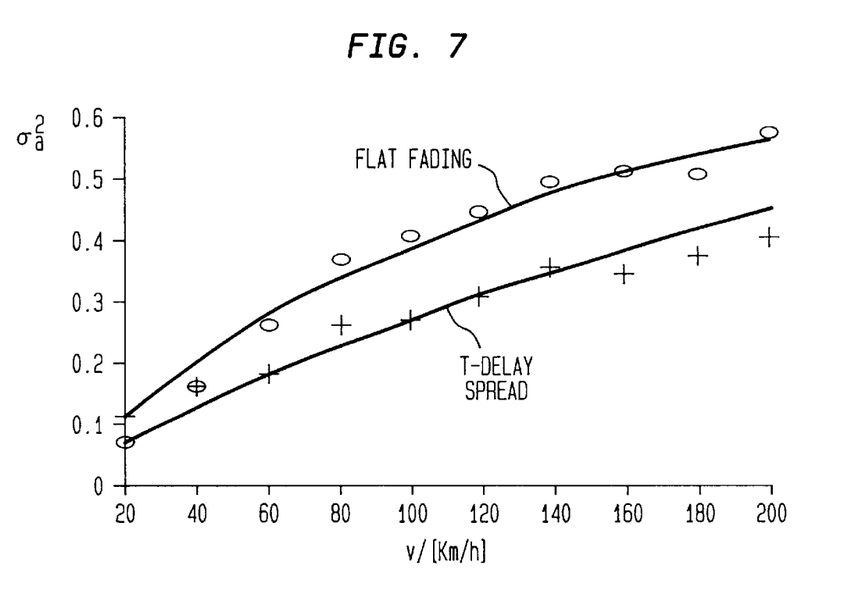
FIG. 7 illustrates a plot of variance $\sigma_a^2$ as a function of Doppler speed respectively for a channel exposed only to flat Rayleigh fading and a channel having T-delay spread.

FIG. 7 illustrates variance $\sigma_a^2$ as a function of Doppler speed. The theoretical curves as shown respectively represent equation (9) for flat Rayleigh fading and fading with T-delay spread. Respective markers (o) and (+) indicate simulated estimates. The transmitted carrier frequency was 800 MHz in this example. As illustrated, the curve for T-delay spread is lower than the curve for flat Rayleigh fading. However, the variation is not appreciably large and since the optimal step-size values used as equalization learning parameters for an LMS algorithm are from rather flat curves around the optimum, the theoretical analysis can be concluded as realistic for delay spread of up to one full symbol duration T. The analysis therefore is independent of delay spread and is not limited to a system exposed only to flat Rayleigh fading.

Simulations also show that the analysis is independent of offsets in sample timing as well as frequency offsets. With regard to frequency offsets, if the received sequence y(k) is corrupted by a frequency offset, the sequence $y(K)e^{j\Omega k}$ will be received. Since only magnitudes are used, $|y(K)e^{j\Omega k}|^2 = |y(k)|^2$ because phase shift drops out. The influence of the frequency offset is therefore completely removed. Simulations also confirm little sensitivity to the additive noise level. For SNR<20 dB, only the estimates for small speeds are corrupted. The noise increases the estimates for 10 km/h by about 15% (SNR=20 dB) to 80% (SNR=12 dB). The values for high speeds remain the same.

Figure 8:
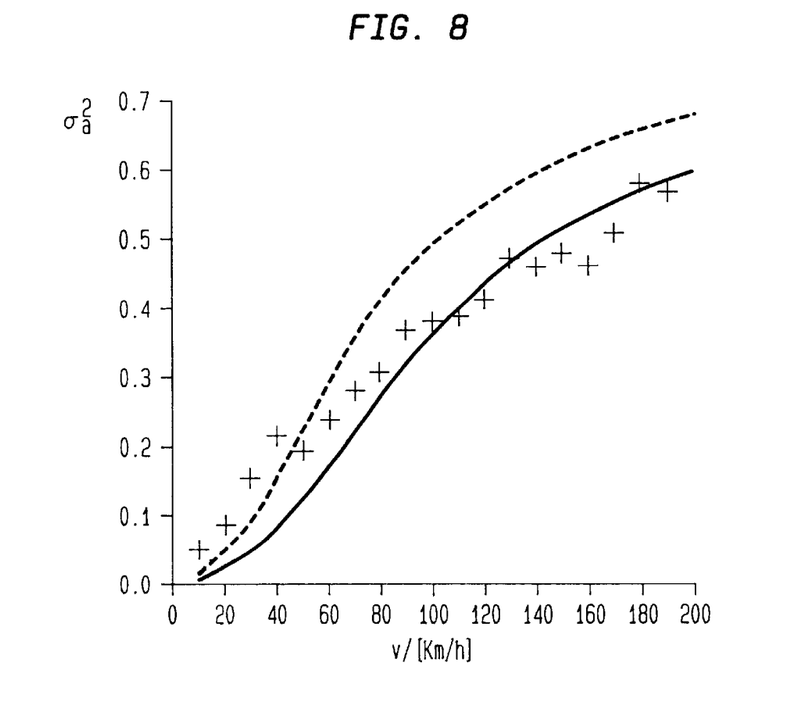
FIG. 8 illustrates a plot of variance $\sigma_a^2$ as a function of parameter f for different carrier frequencies based on the complex derivation.

Another simplification assumed is that the ACF of random process c(k) is not a Bessel-function. However, in reality, the ACF of the random process c(k) would be a Bessel-function, and in addition the channel would not be limited as exposed only to flat Rayleigh fading but would be exposed to arbitrary delay spreads from 0 to T. Since the random process c(k) is a Gaussian process, the following can be derived (see Appendix A subsequent equation (19)):

$$E[|(c(k)|^2|c(k+l)|^2] = r_c^2(o) + r_c^2(l) \quad (11),$$

where $r_c(l)=E[c(k)c^*(k+l)]$, since the ACF is known for this process as $$E[|c(k)|^2|c(k+l)|^2]=1+J_o^2(yl) \quad (12),$$

wherein $y=2\pi T_s f_D$. Unfortunately, there are no closed expressions for finite sums of Bessel-functions, thus the required terms must be numerically computed. For fixed block length L=8 and for N=44 blocks, the results shown in FIG. 8 were obtained. The measured data are from a set of T/2 sampled data, thus giving 352 data elements for every slot. A comparison between 630 MHz (continuous line) and 880 MHz (dashed line) carrier frequencies is depicted. The simulation data (+) was generated for 800 MHz carrier frequency.

As may be appreciated from FIG. 8, the curves for 630 MHz and 880 MHz are not appreciably far apart from each other. Moreover, the simulation markers generally track the curves. Although there is a slight mismatch between the simulated markers and the predicted curves, the simulated data fits well with the predicted curves. Although the curves in FIG. 8 do not precisely match the simulated estimates as well as for the case described earlier wherein the ACF of the random process c(k) is not a Bessel-function, the difference is not appreciably large and it may thus be concluded that even for the case in which Bessel-functions are used as the ACF, the analysis provides reliable results.

In the above described embodiments, the optimum equalization learning parameter is described as determined by controller 39 by accessing memory 42 in accordance with parameter f derived in view of variance $\sigma_a^2$. However, in an alternative embodiment, values of the optimum equalization learning parameter may be directly mapped or prestored in memory 42 for a wide range of values of variance $\sigma_a^2$. As an example, Table 1 lists optimal step-sizes for an LMS algorithm found by simulations for various channel conditions. The optimal step-size $\mu(k)=\alpha(k)/M$ (M being the length of the adaptive filter) choices are roughly independent of the delay spread. Since the corresponding bit error rates (BER) are not very sensitive around the optimum point, a simple mapping can be chosen. An example of a simple mapping of optimum step-size parameters for a range of values of variance $\sigma_a^2$ is given as follows:

$$\alpha(k) = \begin{cases} 0.03 & \text{for} \quad \sigma_a^2 < 0.05 \\ 0.6\sigma_a^2 & \text{for} \quad 0.05 < \sigma_a^2 < 0.25 \\ 0.15 & \text{for} \quad 0.25 < \sigma_a^2 \end{cases} \quad (13)$$

Satisfactory results were obtained based on this simple mapping in accordance with equation (13).

TABLE 1

| Channel | 100 Km/h | 50 Km/h | 8 Km/h |
|---------|----------|---------|--------|
| flat | 0.24 | 0.18 | 0.12 |
| T/4 | 0.27 | 0.18 | 0.09 |
| T/2 | 0.24 | 0.18 | 0.09 |
| T | 0.3 | 0.21 | 0.09 |

It is to be understood that the programming necessary for carrying out the processing as described above may be stored within memory 42, or in the alternative within an internal memory of controller 39. The corresponding programming may also be recorded on a computer readable medium such as a floppy disk or CD ROM readable by controller 39. Moreover, it is to be understood that the receiver of FIG. 2 may be implemented in either base station 10 or mobile station 20 of FIG. 1. Although controller 39 is described as microprocessor-based and functioning in accordance with programming, controller 39 may be comprised of discrete hardware elements including delay circuits, summation circuits, multipliers and absolute value circuits necessary for deriving the corresponding values of mean energy a and variance $\sigma_a^2$ in view of equations (6)–(8) for example. Also, equalizer 37 may be incorporated into controller 39.

In the following a relation between $E[\sigma_a^2]$ and the desired parameter f is derived. In order to compute $E[\sigma_a^2]$, $$E[\sigma_a^2] = E\left[\frac{1}{N}\sum_{k=1}^{N}[a(k)-\bar{a}]^2\right], \quad (14)$$

$$E[\sigma_a^2] = E[a^2(l)] - \frac{1}{N^2}\sum_{k=1}^{N}\sum_{l=1}^{N}E[a(l)a(k)], \quad (15)$$

$$E[\sigma_a^2] = E[a^2(l)] - \frac{1}{N^2}\sum_{k=1}^{N}\sum_{l=1}^{N}r_a(l-k), \quad (16)$$

the autocorrelation $r_a(m)$ for two blocks $$r_a(m)=E[a(l)a(l+m)]$$

has to be computed. Note that $E[a^2(l)]=r_a(O)$. Now, $$r_a(m)=E[a((l)a(l+m)] \quad (17),$$

$$r_a(m) = E\left[\frac{1}{L}\sum_{i=1}^{L}|y(i+(l-1)L)|^2 \frac{1}{L}\sum_{k=1}^{L}|y(k+(l+m-1)L)|^2\right], \quad (18)$$

$$r_a(m) = E\left[\frac{1}{L^2}\sum_{i=1}^{L}\sum_{k=1}^{L}|y(i+(l-1)L)|^2|y(k+(l+m-1)L)|^2\right]. \quad (19)$$

Therefore, in order to compute $r_a(m)$, the simpler expression $$E[|y(k)|^2|y(k+n)|^2]$$

needs to be evaluated first. As emphasized previously, $|y(k)|^2 \approx |c(k)|^2$, and therefore the above term can be approximated to $$E[|y(k)|^2|y(k+n)|^2] \approx E[|c(k)|^2|c(k+n)|^2].$$

Simulation results showed reasonable agreement with this assumption.

It can further be shown that this term can be rewritten into terms of the autocorrelation function:

$$E[|c(k)|^2|c(k+n)|^2]=r_c^2(0)+r_c^2(n),$$

which can be reformulated by $c(k)=x+jy$ and $c(k+n)=u+jv$. Now $E[(x^2+y^2)(u^2+v^2)]$ has to be computed. Because of the dynamic equation (2), x is only statistically dependent on u, and y only on v. With the well known identity for Gaussian processes $$E[xyuv]=E[xy]E[uv]+E[xu]E[yv]+E[xv]E[yu],$$

the following is obtained $$E[(x^2+y^2)(U^2+v^2)]=4(E[x^2]+E[xu]^2).$$

Since symmetric correlation is assumed, i.e., $r_{xu}=r_{yv}$ and $r_{xx}=r_{yy}=r_{uu}=r_{vv}$, it can eventually be concluded that $$E[|c(k)|^2|c(k+n)|2]=4(r_{xx}^2(0)+r_{xx}^2(n))=r_c^2(0)+r_c^2(n).$$

This on the other hand can be formulated in terms of the desired parameter f by substituting $r_c(l)=f^{|l|}$ as follows:

$$E[|c(k)|^2|c(k+n)|^2]=1+f^2|n| \quad (20)$$

Now equation (20) can be substituted in equation (19), and after a lengthy derivation, $$r_a(m) = 1 - \frac{f^{2(mL+1)}}{L^2(1-f^2)^2}(2-f^{2L}-f^{-2L}) \quad (21)$$

is obtained. During this derivation the following expression has been substituted several times:

$$\sum_{l=1}^{N}\sum_{k=1}^{N} g^{|k-1|} = \sum_{l=1}^{N}\left[\sum_{k=1}^{l} g^{k-1} + \sum_{k=l+1}^{N} g^{l-k}\right]$$

$$= \frac{1}{1-g}\sum_{l=1}^{N}[1-g^l+g-g^{N+1-l}]$$

$$= \frac{1}{1-g}\left[N(1+g)-2\frac{g-g^{N+1}}{1-g}\right]$$

$$= \frac{2g^{N+1}-Ng^2-2g+N}{(1-g)^2}.$$

Now evaluating equation (21) for m=0 we obtain $$E[a^2(l)] = r_a(0) = 1 - \frac{f^2}{L^2(1-f^2)^2}(2-f^{2L}-f^{-2L}).$$

Finally, all terms $r_a(m)$ and $r_a(0)$ are known and can be replaced in equation (19):

$$E[\sigma_a^2] = \beta\left[1 - \frac{1}{N^2}\frac{1}{1-f^{2L}}\left(N(1+f^{2L})-2f^{2L}\frac{1-(f^{2L})^N}{1-f^{2L}}\right)\right]$$

is obtained with $$\beta = \frac{1}{(1-f^2)L^2}\left[L(1+f^2)+2f^2\frac{f^{2L}-1}{1-f^2}\right].$$

What is claimed is:

1. A method of equalizing a signal comprising the steps of:
   a) determining mean energy of the signal;
   b) determining a variance between instantaneous energy of the signal and the mean energy of the signal determined in said step a);
   c) generating an estimate of Doppler frequency of the signal based on the variance determined in said step b);
   d) selecting an optimum equalization learning parameter for the signal in accordance with the estimate of Doppler frequency generated in said step c); and
   e) equalizing the signal using the optimum equalization learning parameter selected in said step d).

2. The method of equalizing a signal of claim 1, wherein the signal is transmitted from a base station of a mobile communication system, said step a) includes determining the mean energy of the transmitted signal as received at a mobile station of the mobile communication system.

3. The method of equalizing a signal of claim 2, wherein said step a) includes determining the mean energy of the transmitted signal as received at the mobile station in a fading environment with delay spread of up to one full symbol.

4. The method of equalizing a signal of claim 1, wherein said step a) includes the steps of:
   a1) dividing the signal into N signal blocks;
   a2) determining the average energy of each of the N signal blocks; and
   a3) summing the average energy of the N signal blocks and dividing the summed average energy by N to generate the mean energy of the signal.

5. The method of equalizing a signal of claim 1, wherein said step c) includes selecting the estimate of Doppler frequency from a look-up table based on the variance determined in said step b).

6. The method of equalizing a signal of claim 1, wherein said step e) includes equalizing the signal using a least-mean-squares algorithm, the optimum equalization learning parameter being a step-size of the least-mean-squares algorithm.

7. The method of equalizing a signal of claim 1, wherein said step e) includes equalizing the signal using a recursive-least-squares algorithm, the optimum equalization learning parameter being a forgetting factor of the recursive-least-squares algorithm.

8. The method of equalizing a signal of claim 1, wherein the signal is transmitted from a mobile station of a mobile communication system, said step a) includes determining the mean energy of the transmitted signal as received at a base station of the mobile communication system.

9. A signal processing apparatus for equalizing a signal comprising:
   first determination means for determining mean energy of the signal;
   second determination means for determining a variance between instantaneous energy of the signal and the mean energy of the signal determined by said first determination means;
   generation means for generating an estimate of Doppler frequency of the signal based on the variance determined by said second determination means;
   selection means for selecting an optimum equalization learning parameter for the signal in accordance with the estimate of Doppler frequency generated by said generating means; and
   equalization means for equalizing the signal using the optimum equalization learning parameter selected by said selection means.

10. The apparatus of claim 9, wherein the signal is transmitted from a base station of a mobile communication system, said first determination means determining the mean energy of the transmitted signal as received at a mobile station of the mobile communication system.

11. The apparatus of claim 10, wherein said first determination means determines the mean energy of the transmitted signal as received at the mobile station in a fading environment with delay spread of up to one full symbol.

12. The apparatus of claim 9, wherein said first determination means comprises:
   division means for dividing the signal into N signal blocks;
   averaging means for determining the average energy of each of the N signal blocks; and
   summation means for summing the average energy of the N signal blocks and dividing the summed average energy by N to generate the mean energy of the signal.

13. The apparatus of claim 9, wherein said generation means selects the estimate of Doppler frequency from a look-up table based on the variance determined by said second determination means.

14. The apparatus of claim 9, wherein said equalization means equalizes the signal using a least-mean-squares algorithm, the optimum equalization learning parameter being a step-size of the least-mean-squares algorithm.

15. The apparatus of claim 9, wherein said equalization means equalizes the signal using a recursive-least-squares algorithm, the optimum equalization learning parameter being a forgetting factor of the recursive-least-squares algorithm.

16. The apparatus of claim 9, wherein the signal is transmitted from a mobile station of a mobile communication system, said first determination means determining the mean energy of the transmitted signal as received at a base station of the mobile communication system.

17. A signal processing apparatus for equalizing a signal comprising:

a controller that determines mean energy of the signal, determines a variance between instantaneous energy of the signal and the mean energy of the signal and provides an estimate of Doppler frequency of the signal based on the variance;

a memory that stores respective optimum equalization learning parameters for Doppler frequencies; and an equalizer that equalizes the signal using an optimum equalization learning parameter, said controller selects the optimum equalization learning parameter for the signal from said memory based on the estimate of Doppler frequency.

18. The apparatus of claim 17, wherein the signal is transmitted from a base station of a mobile communication system, said controller determines the mean energy of the transmitted signal as received at a mobile station of the mobile communication system.

19. The apparatus of claim 18, wherein said controller determines the mean energy of the transmitted signal as received at the mobile station in a fading environment with delay spread of up to one full symbol.

20. The apparatus of claim 17, wherein said controller divides the signal into N signal blocks, determines the average energy of each of the N signal blocks, sums the average energy of the N signal blocks and divides the summed average energy by N to generate the mean energy of the signal.

21. The apparatus of claim 17, wherein said memory is a look-up table.

22. The apparatus of claim 17, wherein said equalizer equalizes the signal using a least-mean-squares algorithm, the optimum equalization learning parameter being a step-size of the least-mean-squares algorithm.

23. The apparatus of claim 17, wherein said equalizer equalizes the signal using a recursive-least-squares algorithm, the optimum equalization learning parameter being a forgetting factor of the recursive-least-squares algorithm.

24. The apparatus of claim 17, wherein the signal is transmitted from a mobile station of a mobile communication system, said controller determining the mean energy of the transmitted signal as received at a base station of the mobile communication system.

25. An article of manufacture taking the form of a computer-readable medium for equalizing a signal, the article of manufacture comprising:

a first determination source code segment for causing a computer to determine mean energy of the signal;

a second determination source code segment for causing the computer to determine a variance between instantaneous energy of the signal and the mean energy of the signal;

a generation source code segment for causing the computer to generate an estimate of Doppler frequency of the signal based on the variance;

a selection source code segment for causing the computer to select an optimum equalization learning parameter for the signal in accordance with the estimate of Doppler frequency; and an equalization source code segment for causing the computer to equalize the signal using the optimum equalization learning parameter selected for the signal.

26. The article of manufacture of claim 25, further comprising a receiving source code segment for causing the computer to receive the signal as transmitted from a mobile station of a mobile communication system, the signal being equalized at a base station of the mobile communication system.

27. The article of manufacture of claim 25, further comprising a receiving source code segment for causing the computer to receive the signal as transmitted from a base station of a mobile communication system, the signal being equalized at a mobile station of the mobile communication system.

* * * * *